United States Patent [19]
Arimilli et al.

[11] Patent Number: 6,101,582
[45] Date of Patent: Aug. 8, 2000

[54] DCBST WITH ICBI MECHANISM

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 09/024,639

[22] Filed: Feb. 17, 1998

[51] Int. Cl.[7] .................................................. G06F 12/00
[52] U.S. Cl. .................... 711/141; 711/142; 711/146; 711/121
[58] Field of Search .................................. 711/141, 142, 711/119, 121, 122, 146

[56] References Cited

U.S. PATENT DOCUMENTS

| | | | |
|---|---|---|---|
| 5,226,144 | 7/1993 | Moriwaki et al. | 711/121 |
| 5,276,848 | 1/1994 | Gallagher et al. | 395/425 |
| 5,822,765 | 10/1998 | Boatright et al. | 711/146 |
| 5,909,698 | 6/1999 | Arimilli et al. | 711/145 |

*Primary Examiner*—Meng-Ai T. An
*Assistant Examiner*—Mackly Monestime
*Attorney, Agent, or Firm*—Volel Emile; Felsman, Bradley, Vaden, Gunter & Dillon, LLP

[57] ABSTRACT

Depending on a processor or instruction mode, a data cache block store (dcbst) or equivalent instruction is treated differently. A coherency maintenance mode for the instruction, in which the instruction is utilized to maintain coherency between bifurcated data and instruction caches, may be entered by setting bits in a processor register or by setting hint bits within the instruction. In the coherency maintenance mode, the instruction both pushes modified data to system memory and invalidates the cache entry in instruction caches. Subsequent instruction cache block invalidate (icbi) or equivalent instructions targeting the same cache location are no-oped when issued by a processor following a data cache block store or equivalent instruction executed in coherency maintenance mode. Execution of the data cache clock store instruction in coherency maintenance mode results in a novel system bus operation being initiated on the system bus. The bus operation directs other devices having bifurcated data and instruction caches to clean the specified cache entry in their data cache to at least the point of instruction/data cache coherency and invalidate the specified cache entry in their instruction cache. When repeatedly employed in sequence to write one or more pages of data to system memory, the mechanism for maintaining coherency saves processor cycles and reduces both address and data bus traffic.

18 Claims, 5 Drawing Sheets

DCBST WITH ICBI MECHANISM

BACKGROUND OF THE INVENTION

1. Technical Field

The present invention relates in general to coherency of bifurcated data and instruction caches and in particular to instructions to maintain coherency of bifurcated data and instruction caches. Still more particularly, the present invention relates to instructions and system bus transactions for maintaining coherency between data and instruction caches in a multiprocessor system having multiple copies of a subject cache entry.

2. Description of the Related Art

Superscalar reduced instruction set (RISC) processors typically include bifurcated data and instruction caches in at least the level one (L1) layer of the storage hierarchy. Separate data and instructions caches are necessary due to the bandwidth required in contemporary superscalar processors, where instruction fetches and data references may easily exceed more than one cache access per processor cycle. L1 caches, which are typically imbedded within the processor hardware and designed for latencies of one processor cycle or less, are therefore usually bifurcated so that instruction and data references may be issued to separate caches during the same processor cycle.

The bifurcation of data and instruction caches adds an additional aspect to the problem of maintaining a coherent memory hierarchy, that is, to provide a single view of the contents of memory to all of the processors. For example, periodically a processor will modify data in a data cache which is actually instructions to be executed later. This may occur, for example, when a loader program resolves code linkages after loading the code into memory. As another example, a processor which copies pages of memory contents does not distinguish between instructions and data and may copy the same page contents to both instruction and data caches. Both instruction cache block invalidate and clean operations are subsequently required to free a cache location containing a portion of the copied page.

Most currently available superscalar processors do not include any mechanism for maintaining coherency of bifurcated level one caches; that is, changes in one L1 cache are not automatically reflected in other L1 caches, whether in a different processor or in the same processor. In most superscalar processors, maintaining coherency between bifurcated data and instruction caches is left to software. Software typically handles the problem of maintaining coherency between bifurcated caches by flushing modified data cache entries which originally contained instructions and invalidating the same cache entries if resident in the instruction cache. These actions are taken for all altered lines within the program source code, one page at a time.

All superscalar processors support an instruction for writing modified data from a level one cache to system memory. Such instructions may be used by programmers to make a modified cache line immediately visible outside the processor. This is useful in graphics applications, for writing display information to a memory mapped graphics adapter or a display buffer. By far the most prevalent use of such instructions, however, is for software management of bifurcated data/instruction cache coherency. When used for such purposes, the instruction writing modified data to memory may be followed by an instruction invalidating the same cache location in instruction caches. In the PowerPC™ family of devices, for example, the instruction which writes modified data to system memory is the data cache block store (dcbst) instruction, while the instruction invalidating the cache location in instruction caches is the instruction cache block invalidate (icbi) instruction.

When the dcbst instruction is executed, the effective address is computed, translated, and checked for protection violations. If the cache location referenced by the address does not contain modified data, the cache block is left unchanged (the instruction is treated as a no-op) and a clean operation is initiated on the system bus. If the cache block contains modified (dirty) data, however, the data is pushed out of the data cache onto the system bus. All bytes in the cache block are written to system memory and the coherency state of the cache block is set to exclusive (E), indicating that the cache block contains valid data consistent with the corresponding location in system memory but found only, within all caches at that level of the storage hierarchy, in the subject cache. A write operation is then initiated on the system bus.

When the icbi instruction is executed, the effective address is again computed, translated, and checked for protection violations. If the addressed cache block is in the instruction cache, the instruction cache block is marked invalid, indicating that cache entry—both the address tag and the contents—is not valid and not coherent with either system memory or any other cache at the same level of the storage hierarchy. Both the content and the status of the cache block remains unchanged within the data cache of all processors. The icbi or ikill operation is initiated unconditionally on the system bus to invalidate the appropriate cache line of all other instruction caches throughout the storage hierarchy.

The instruction pair described above does not occur regularly during execution of typical program source code. When utilized to flush modified data cache entries originally containing instructions and invalidate the cache block within instruction caches, however, entire pages of memory are flushed one cache block at a time. Thus a large group of dcbst/icbi instruction pairs will be executed within a relatively short period.

Another need which periodically arises in multiprocessor systems is for a cache entry to be written to an alternative cache location previously containing instructions, the newly modified cache entry to be made coherent with system memory, and the new cache location to be invalidated in all instruction caches. That is, it is desirable to write the contents of cache entry x to cache entry y, update system memory corresponding to cache entry y, and invalidate cache entry y in all instruction cache in the system. In current systems, it is necessary to execute a number of instructions to achieve this result: the contents of cache entry x are written to cache entry y inside the cache, then a dcbst instruction is executed on cache entry y, then an icbi instruction is executed on cache entry y, and finally a synchronization (sync) instruction is executed to ensure that all instructions are completed.

It would be desirable, therefore, to provide an improved mechanism for flushing modified data in cache blocks originally containing instructions to system memory and to invalidate the cache blocks in instruction caches. It would further be advantageous for the mechanism to be implemented in a single instruction and system bus operation.

SUMMARY OF THE INVENTION

It is therefore one object of the present invention to provide an improved mechanism for maintaining coherency of bifurcated data and instruction caches.

It is another object of the present invention to providing improved instructions for maintaining coherency of bifurcated data and instruction caches.

It is yet another object of the present invention to providing improved instructions and system bus transactions for maintaining coherency between data and instruction caches in a multiprocessor system having multiple copies of a subject cache entry.

The foregoing objects are achieved as is now described. Depending on a processor or instruction mode, a data cache block store (dcbst) or equivalent instruction is treated differently. A coherency maintenance mode for the instruction, in which the instruction is utilized to maintain coherency between bifurcated data and instruction caches, may be entered by setting bits in a processor register or by setting hint bits within the instruction. In the coherency maintenance mode, the instruction both pushes modified data to system memory and invalidates the cache entry in instruction caches. Subsequent instruction cache block invalidate (icbi) or equivalent instructions targeting the same cache location are no-oped when issued by a processor following a data cache block store or equivalent instruction executed in coherency maintenance mode. Execution of the data cache clock store instruction in coherency maintenance mode results in a novel system bus operation being initiated on the system bus. The bus operation directs other devices having bifurcated data and instruction caches to clean the specified cache entry in their data cache to at least the point of instruction/data cache coherency and invalidate the specified cache entry in their instruction cache. When repeatedly employed in sequence to write one or more pages of data to system memory, the mechanism for maintaining coherency saves processor cycles and reduces both address and data bus traffic.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
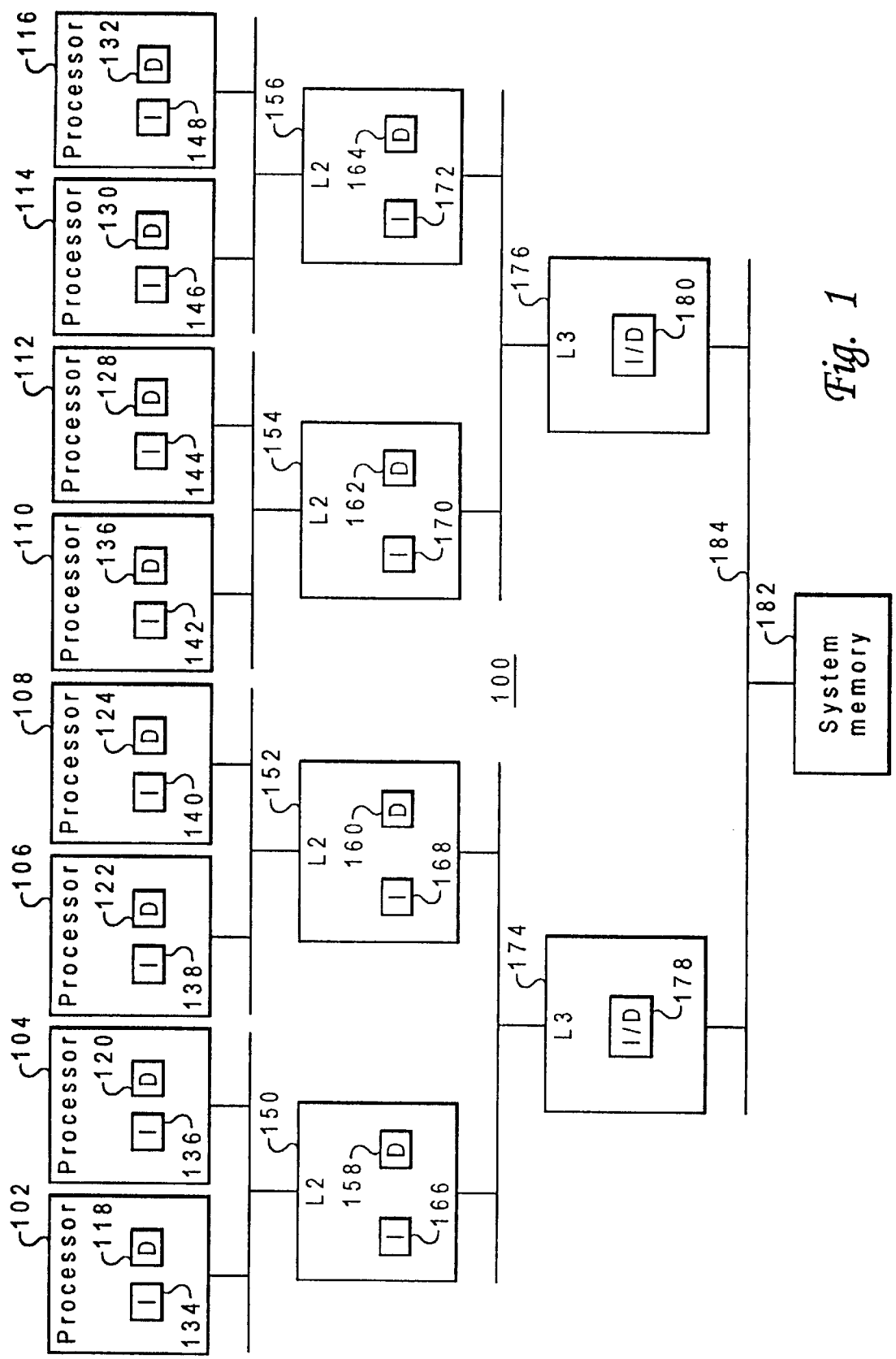
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102–116, which preferably comprise one of the PowerPC™ family of processors available from International Business Machines of Armonk, N.Y. Although eight processors are depicted in the exemplary embodiment, those skilled in the art will appreciate that fewer or additional processors may be utilized in a multiprocessor data processing system in accordance with the present invention.

Each processor 102–116 includes a level one (L1) data cache 118–132 and an L1 instruction cache 134–148. Although illustrated as bifurcated instruction and data caches in the exemplary embodiment, those skilled in the art will recognize that a single, unified L1 cache may be implemented within any of processors 102–116. The present invention finds particularly useful application, however, in systems where instruction and data caches are bifurcated in at least one level of the storage hierarchy.

In order to minimize data access latency, one or more additional levels of cache memory may be implemented within data processing system 100, such as level two (L2), level three (L3), or further levels of cache memory. In the exemplary embodiment, selected to fully explain the advantages and features of the present invention, L2 cache controllers 150–156 are depicted with bifurcated L2 data caches 158–164 and L2 instructions caches 166–172. L3 cache controllers 174 and 176 operate on unified instruction/data (I/D) caches 178 and 180, respectively. System memory 182 completes the storage hierarchy in the depicted embodiment.

The lower cache levels—L2 and L3—are employed to stage data to the L1 caches and typically have progressively larger storage capacities but longer access latencies. For example, L1 data caches 118–132 and L1 instruction caches 134–148 may each have a storage capacity of 32 KB and an access latency of approximately 1–2 processor cycles. L2 data caches 158–164 and L2 instructions caches 166–172 might each have a storage capacity of 512 KB but an access latency of 5 processor cycles, while L3 caches 178 and 180 may have a storage capacity of 4 MB but an access latency of greater than 15 processor cycles. L2 caches 158–164 and 166–172 and L3 caches 178 and 180 thus serve as intermediate storage between processors 102–116 and system memory 182, which typically has a much larger storage capacity but may have an access latency of greater than 50 processor cycles.

Both the number of levels in the cache hierarchy and the cache hierarchy configuration employed in data processing system 100 may vary. L2 caches 158–164 and 166–172 and L3 caches 178 and 180 in the example shown are private, dedicated caches connected between their respective processors 102–116 and system memory 182 (via system bus 184). However, shared caches and lookaside caches operating in parallel with a higher cache level may also be employed in conjunction with the present invention. Those skilled in the art will recognize that various permutations of levels and configurations depicted may be implemented. Additionally, only so much of a complete data processing system as is required for understanding of the invention is depicted. Those skilled in the art will recognize that additional devices may be incorporated into data processing system 100 in accordance with known techniques. Such modifications and variations are within the spirit and scope of the present invention.

Figure 2:
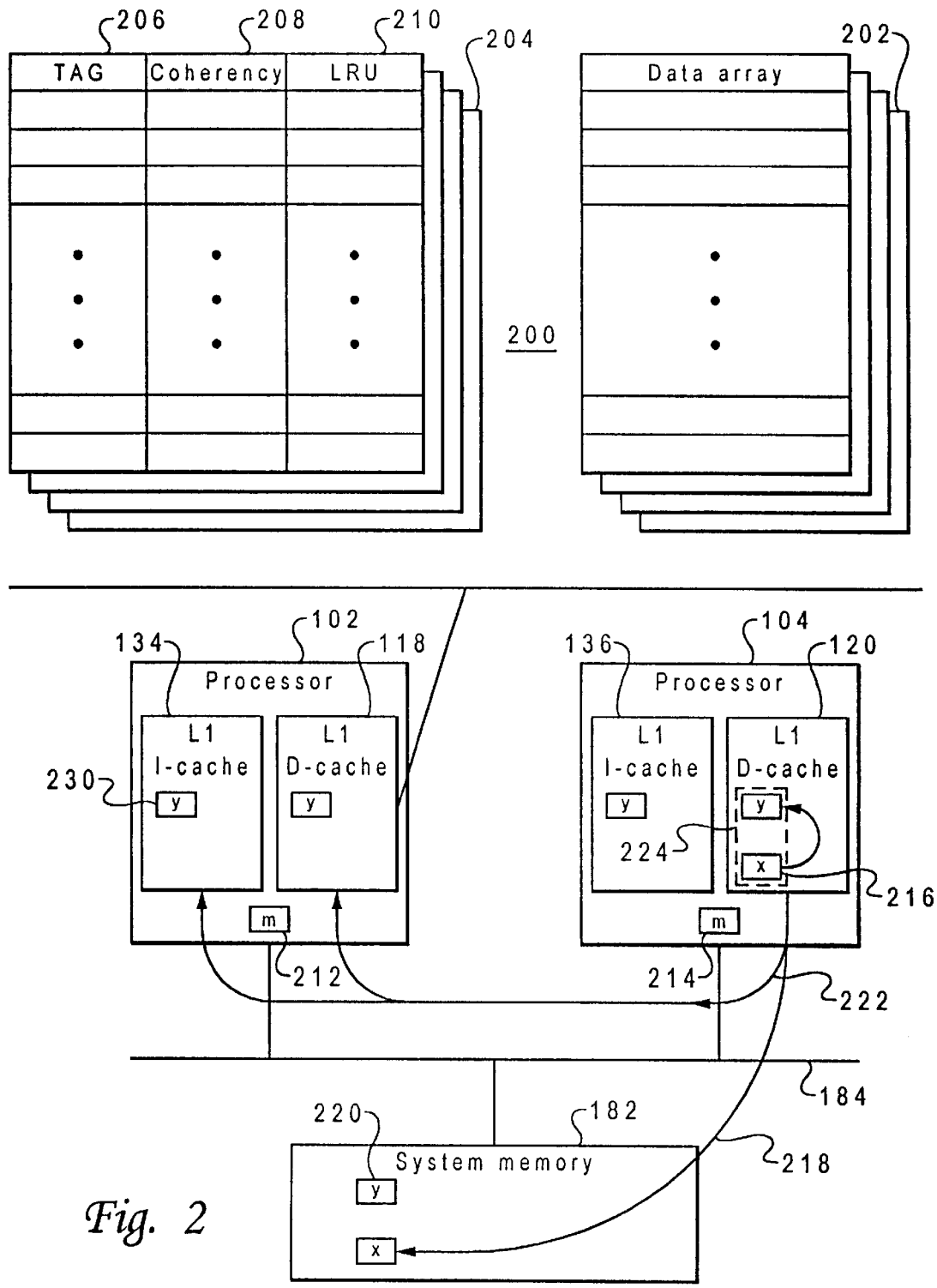
FIG. 2 is a logical block diagram of the mechanism for maintaining coherency between bifurcated data and instruction caches in accordance with a preferred embodiment of the present invention.

Referring to FIG. 2, a logical block diagram of the mechanism for maintaining coherency between bifurcated data and instruction caches in accordance with a preferred embodiment of the present invention is illustrated. For the purposes of describing and explaining the data/instruction cache coherency mechanism of the present invention, processors 102 and 104, their respective data caches 118 and 1208 and instructions caches 134 and 136, system memory 182 and system bus 184 depicted in FIG. 1 are utilized. However, those skilled in the art will recognize that other devices, such as L2 caches 158–164 and 166–172 and L3 caches 178 and 180 depicted in FIG. 1, may also be affected by the mechanism of the present invention.

Each L1 cache depicted in FIG. 2 includes cache memory 202 and cache directory 204, as shown in connection with L1 data cache 118 of processor 102. Each L1 cache may be an n way set associative cache utilizing, for example, 32 bit addresses. Accordingly, cache memory or data array 202 comprises a number of congruence classes or rows each containing sufficient memory for storing n cache lines. A cache line, also referred to as a cache block, is the unit of cache memory which a coherency state describes. Generally a cache line is 32, 64 or 128 B long in contemporary data processing systems.

Cache directory 204 also contains a number of rows each containing n directory entries, each directory entry associated with a corresponding cache line in the equivalent row of cache memory 202. Each directory entry includes at least a tag field 206, a coherency state field 208, and a least recently used (LRU) field 210. Tag field 206 is utilized to store the tag field (e.g., bits [0–19]) of the system memory address of the data stored in an associated cache line. Coherency state field 208 defines, through a predefined bit combination, the coherency state of the data stored in the associated cache line. LRU field 210 indicates how recently the associated cache line has been accessed relative to other cache lines in the congruence class, and thus indicates which cache line should be cast out of the congruence class should the need for replacement of a cache line arise.

Each processor 102 and 104 includes a mode bit 212 and 214 which may be utilized to control how the processor treats a dcbst instruction. (As used in the description of the invention, references to dcbst, icbi, or any other instruction name specific to the PowerPC™ architecture are intended to encompass comparable instructions for other processors, regardless of the instruction name). Mode bits 212 and 214 may be contained in a special purpose register (SPR) accessible by user-level software through the move to/from SPR instructions (mtspr, mfspr) as is known in the art. If mode bit 214 for a particular processor is in a first state (e.g., not set), a dcbst instruction has the same effect as in contemporary processors employing this instruction: if the coherency state field 208 for the target cache block is in the modified state, data in the target cache block 216 is pushed 218 to the corresponding location 220 in system memory 182. However, if mode bit 214 is in a second state (e.g., set), then a dcbst instruction is treated as a combination dcbst and icbi instruction. In this "coherency maintenance" mode, the instruction achieves multiple results: if the coherency state field 208 is modified, data in the target cache block 216 is pushed 218 to the corresponding location 220 in system memory 120 and, regardless of the coherency state field 208, a novel system bus operation 222 is initiated. System bus operation 222 is either "clean w/ ikill" or a "write w/ clean w/ ikill" depending on whether lower level caches (e.g., L2 or L3 caches) are present between processor 104 and system bus 184. The "write" portion of operation 222 directs logically in line caches to write modified data in the target cache location to system memory 120. The "clean w/ ikill" portion of operation 222 directs processor 102 to clean the subject cache location in its L1 data cache 118 (push modified data to system memory while leaving data cache entry valid) and invalidate the subject cache location in its L1 instruction cache 134.

Providing a dual character to the dcbst instruction, described above as being achieved by setting a mode bit in a processor register, may be implemented through other mechanisms. For example, "hint" bits associated with the dcbst instruction may be set in accordance with the known art. Like other instructions, the dcbst instruction includes an opcode field and two operand fields, with one operand field being unused. Bits within the unused operand field—so called "hint" bits—may be set within the executable code for detection by a processor designed to support the use of such hint bits. In this manner, a later generation of a processor may support the dual character dcbst instruction while the same executable code may be run on an older generation of the processor which does not provide such support. Hint bits may also be set in subsequent instruction cache block invalidate or equivalent instructions for purposes described in greater detail below.

Rather than writing modified data all the way to system memory 120, the dcbst instruction in coherency maintenance mode may instead only write the modified data to the level of I/D coherency. Writing modified data all the way to system memory incurs a significant performance penalty. It is preferable, therefore, to write the modified data only to the level of certain instruction/data cache coherency—i.e., the highest level in the storage hierarchy where a unified cache is employed. This occurs at L3 caches 178 and 180 in the example depicted in FIG. 1.

In the mechanism of the present invention for maintaining coherency between bifurcated data and instruction caches, the combined dcbst/icbi instruction which results from setting mode bit 214 or hints bits may be utilized in a variety of fashions. The combined instruction may be repeatedly executed in sequence on each cache block within an entire page 224 of memory, or within several pages of memory, to update a graphics device or display buffer. The need for a separate icbi instruction is eliminated, and icbi's from a local processor are no-oped when mode bit 214 is set. In heterogeneous systems, snooped icbi's may still be treated as an icbi when mode bit 214 is set. Alternatively, where the contents of a cache location x have been copied to a separate location y within the cache, and modified data (y') is written to location y, the combined dcbst/icbi instruction may be utilized to invalidate corresponding cache locations in horizontal caches.

Figure 3A:
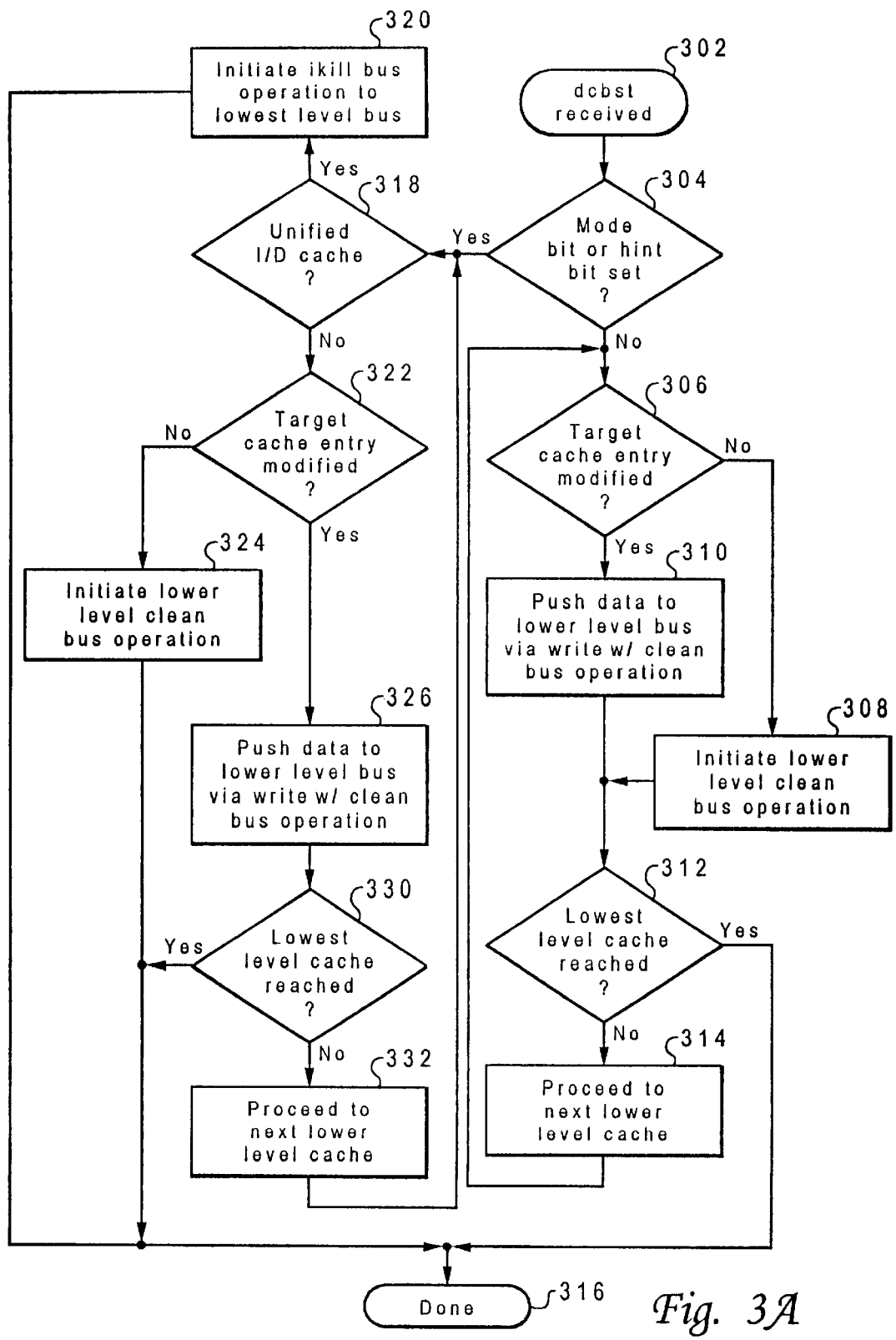
FIGS. 3A–3C depict high level flowcharts for processes of executing instructions and operations implementing the mechanism for maintaining coherency between bifurcated data and instruction caches in accordance with a preferred embodiment of the present invention.
Figure 3B:
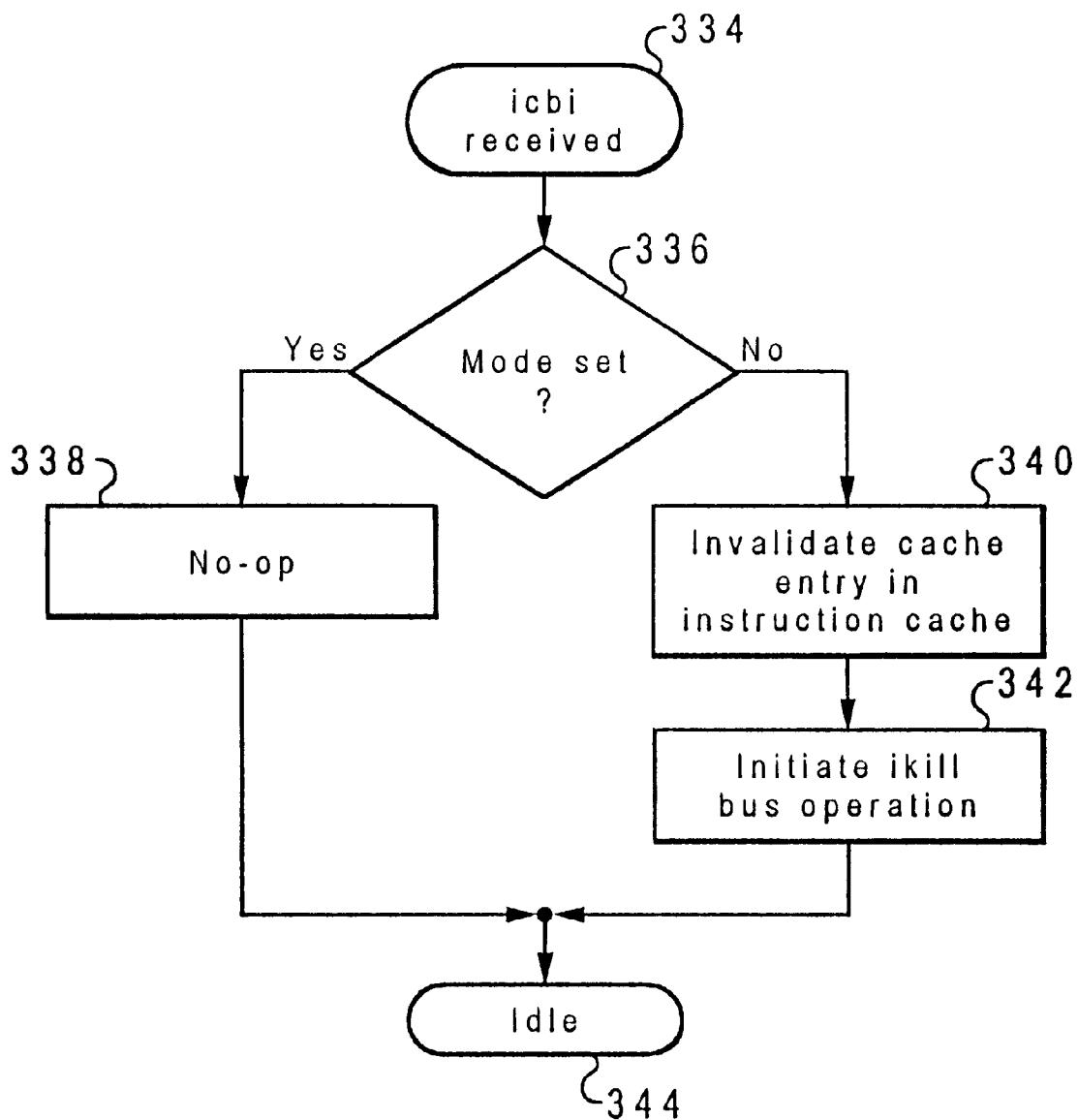
Figure 3C:
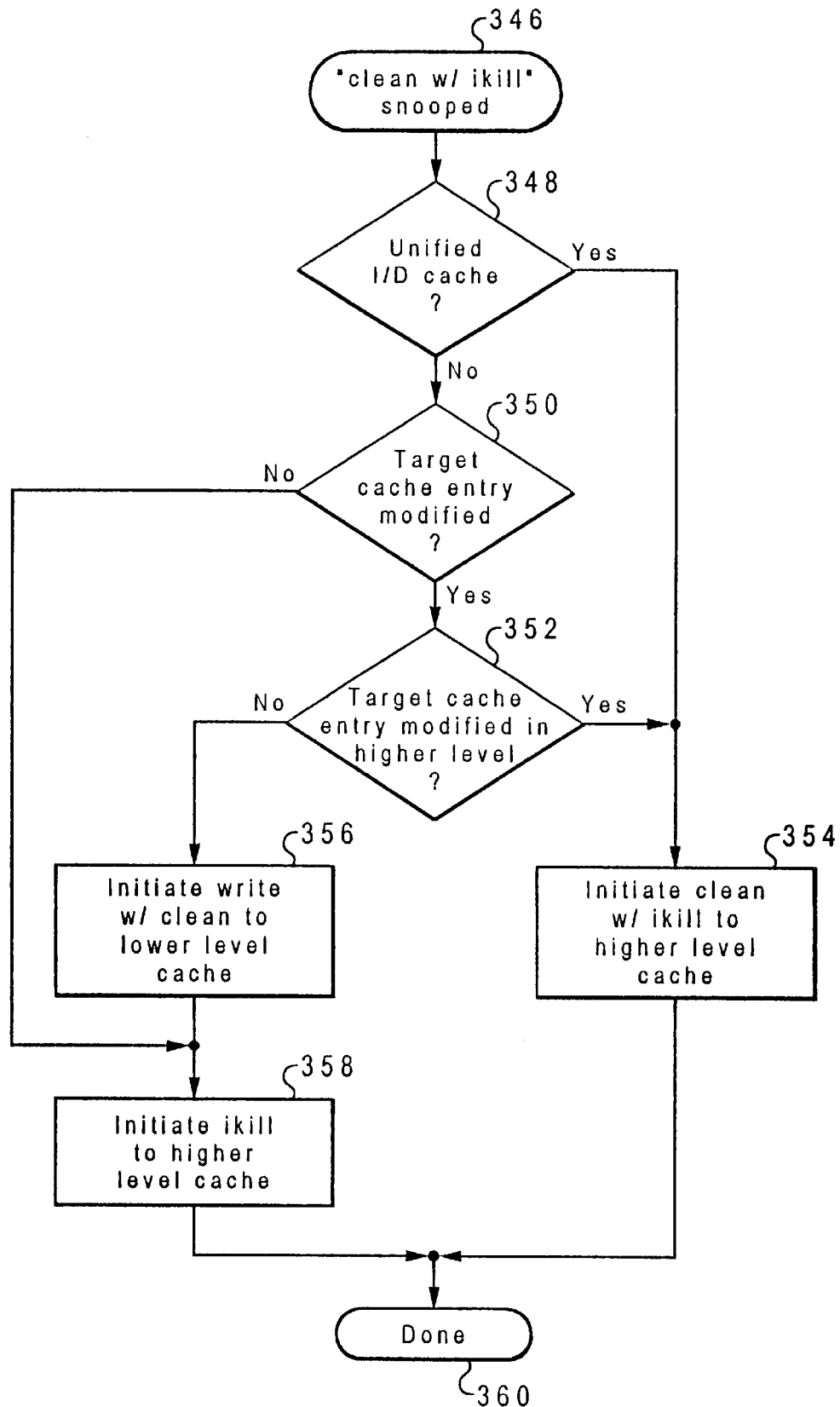

With reference now to FIGS. 3A–3C, high level flowcharts for processes of executing instructions and operations implementing the mechanism for maintaining coherency between bifurcated data and instruction caches in accordance with a preferred embodiment of the present invention are depicted. FIG. 3A depicts a process for handling dcbst instructions issued by a local processor. The process begins at step 302, which depicts receiving a dcbst or equivalent instruction. The process then passes to step 304, which illustrates a determination of whether the instruction was received in a coherency maintenance mode. This determination may be made, for example, by determining whether a mode bit or hint bits were set. If the instruction was not received in a coherency maintenance mode, the process proceeds to step 306, which depicts a determination of whether the target cache entry for the instruction is modified. If not, the process proceeds to step 308, which illustrates initiating a clean operation on a lower level bus, and then to step 312, described below.

Referring again to step 306, if the target cache entry of the dcbst or equivalent instruction contains modified data, the process proceeds instead to step 310, which depicts pushing the modified data to a lower level bus utilizing a write w/ clean bus operation. The process then passes to step 312, which illustrates a determination of whether the lowest level cache in the storage hierarchy, between the processor issuing the dcbst or equivalent instruction and the system memory, has been examined. If not, the process proceeds to step 314, which depicts proceeding to the next lower level cache in the storage hierarchy, and then returns to step 306 to repeat the process depicted in steps 306–314 for the next lower cache level. The process will thus iteratively proceed through all cache levels in the storage hierarchy. Referring again to step 312, once the lowest level cache has been reached and handled, the process proceeds instead to step 316, which illustrates the process becoming idle until the next dcbst or equivalent instruction is received.

Referring back to step 304, if the dcbst or equivalent instruction is received in a coherency maintenance mode, the process proceeds instead to step 318, which depicts a determination of whether the cache level being examined is I/D coherent. This determination may be made, for example, by determining whether the cache is implemented as a unified cache or as bifurcated I/D caches. If the cache being examined is at the point of I/D coherency within the storage hierarchy, the process proceeds to step 320, which illustrates initiating an ikill bus operation to the lowest level bus. The process then passes to step 316, described above.

Referring again to step 318, if the cache level being examined is at the point of I/D coherency within the storage hierarchy, the process proceeds instead to step 322, which depicts a determination of whether the target cache entry for the dcbst or equivalent instruction is modified. If not, the process proceeds to step 324, which illustrates initiating a clean operation on a lower level bus, and then to step 316, described above.

Referring again to step 322, if the target cache entry of the dcbst or equivalent instruction contains modified data, the process proceeds instead to step 326, which depicts pushing the modified data to a lower level bus utilizing a write w/ clean bus operation. The process then passes to step 330, which illustrates a determination of whether the lowest level cache in the storage hierarchy has been examined. If not, the process proceeds to step 332, which depicts proceeding to the next lower level cache in the storage hierarchy, and then returns to step 318 to repeat the process depicted in steps 318–332 for the next lower cache level. The process will thus iteratively proceed through all cache levels in the storage hierarchy. Referring again to step 332, once the lowest level cache has been reached and handled, the process proceeds instead to step 316, which illustrates the process becoming idle until the next dcbst or equivalent instruction is received.

FIG. 3B depicts a process for handling icbi instructions issued by a local processor. The process begins at step 334, which depicts receipt of an icbi instruction. The process then passes to step 336, which illustrates a determination of whether the bit controlling treatment of the combined dcbst/icbi instruction is set (e.g., a processor mode bit or a hint bit in the dcbst and icbi instructions). If so, the process proceeds to step 338, which depicts no-oping the icbi instruction. If the bit is not set (the instruction is not received in coherency maintenance mode), however, the process proceeds instead to step 340, which illustrates invalidating the target cache entry in the instruction cache, and then to step 342, which depicts initiating an ikill operation on the system bus. From either of steps 338 or 342, the process passes to step 344, which illustrates the process becoming idle until a subsequent icbi instruction is received.

FIG. 3C depicts a process of handling a clean w/ ikill bus operation snooped from the system bus. The process begins at step 346, which depicts detection of the clean w/ ikill operation on the system bus. The process next passes to step 348, which illustrates a determination of whether the cache level snooping the operation is at the point of I/D coherency (e.g., whether the cache is a unified cache). If so, the process proceeds to step 354, described below. If not, however, the process proceeds instead to step 350, which depicts a determination of whether the target cache entry for the snooped clean w/ ikill operation is modified. If not, the process proceeds to step 358, described below. If so, however, the process proceeds instead to step 352, which illustrates a determination of whether the target cache entry of the snooped operation is modified in a higher level cache.

If the target cache entry of the snooped operation is modified in a higher level cache, the process proceeds to step 354, which depicts initiating a clean w/ ikill operation to the higher level cache. If not, however, the process proceeds instead to step 356, which illustrates initiating a write w/ clean operation to the next lower level cache, and then passes to step 358, which depicts initiating an ikill operation to the higher level cache. From either of steps 354 or 358, the process passes to step 360, which illustrates the process becoming idle until another clean w/ ikill operation is snooped.

The present invention allows a dcbst instruction to be efficiently utilized to maintain coherency between bifurcated data and instruction caches. When the mechanism of the present invention is utilized, processor cycles are saved since only one instruction is issued rather than two. Increased system performance is achieved since instruction cache block invalidate instructions and clean operations occur in parallel rather than serialized fashion. A novel system bus operation is initiated as a result of executing the combined dcbst/icbi mechanism of the present invention. Address bus traffic under this system bus operation is reduced since only one bus operation is initiated instead of two. Data bus traffic is similarly reduced, particularly when the mechanism of the present invention is implemented to write modified data only to the point of I/D coherency. Although described and illustrated as implemented within a storage hierarchy where all instructions are received and handled from a higher level of the storage hierarchy, the mechanism of the present invention may also be utilized in connection with architectures where architected operations are passed through and self-snooped from the system bus for concurrent handling. Such an architecture is disclosed, for example, in U.S. patent applications 08/039445 (Docket Nos. AT9-97-193, AT9-97-194, AT9-97-195, AT9-97-292, AT9-97-293, and AT9-97-294), which are incorporated herein by reference.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. In particular, a set of program instructions may include an instruction setting the mode bit altering the manner in which dcbst instructions are treated, followed by one or more dcbst instructions. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of maintaining coherency between bifurcated instruction and data caches, comprising:
   receiving a data cache block store instruction including a target cache address from a local processor;
   determining whether a coherency maintenance mode is enabled;
   responsive to determining that the coherency maintenance mode is enabled,
      writing modified data, if any, in a data cache location corresponding to the target cache address to a point of instruction/data cache coherency within a storage hierarchy containing the cache location, and
      invalidating an instruction cache location corresponding to the target cache address; and
   responsive to determining that the coherency maintenance mode is not enabled,
      writing modified data, if any, in the data cache location corresponding to the target cache address to a lower level bus, and
      initiating a clean operation on the lower level bus.

2. The method of claim 1, wherein the step of determining whether a coherency maintenance mode is enabled further comprises:
   determining whether a mode bit is set within a processor register.

3. The method of claim 1, wherein the step of determining whether a coherency maintenance mode is enabled further comprises:
   determining whether a hint bit is set within the instruction.

4. The method of claim 1, wherein the step of writing modified data, if any, in a data cache location corresponding to the target cache address to a point of instruction/data cache coherency within a storage hierarchy containing the cache location further comprises:
   writing the modified data to a unified instruction/data cache within the storage hierarchy.

5. The method of claim 1, wherein the step of writing modified data, if any, in a data cache location corresponding to the target cache address to a point of instruction/data cache coherency within a storage hierarchy containing the cache location further comprises:
   writing the modified data to a system memory.

6. The method of claim 1, wherein the step of writing modified data, if any, in a data cache location corresponding to the target cache address to a point of instruction/data cache coherency within a storage hierarchy containing the cache location further comprises:
   determining whether data within the data cache location corresponding to the target cache address is modified; and
   responsive to determining that data within the data cache location corresponding to the target cache address is modified:
      pushing the data to a lower level bus; and
      initiating a clean operation on the lower level bus.

7. The method of claim 6, further comprising:
   responsive to determining that data within the data cache location corresponding to the target cache address is not modified, initiating a clean operation on the lower level bus.

8. The method of claim 1, wherein the step of writing modified data, if any, in a data cache location corresponding to the target cache address to a point of instruction/data cache coherency within a storage hierarchy containing the cache location further comprises:
   determining whether a cache receiving the instruction is a unified cache;
   responsive to determining that the cache receiving the instruction is not a unified cache, determining whether a lower cache receiving a clean operation including the target cache address is a unified cache; and
   responsive to determining that the lower cache receiving the clean operation is a unified cache, initiating an instruction cache block invalidate instruction including the target cache address to a lower level bus.

9. The method of claim 1, further comprising:
   initiating a clean with instruction block kill operation on a lower level bus.

10. A data processing system, comprising:
    a processor; and
    a storage hierarchy connected to the processor, the storage hierarchy supporting a coherency maintenance mode for a data cache block store instruction issued by the processor, the storage hierarchy including:
       at least one cache level connected to the processor; and
       a system memory, wherein each cache level within the storage hierarchy having bifurcated instruction and data caches, responsive to receiving a data cache block store instruction from the processor or a write with clean operation from a higher level cache while the coherency maintenance mode is enabled,
       writes modified data, if any, in a data cache location corresponding to the target cache address to a point of instruction/data cache coherency within the storage hierarchy, and
       invalidates an instruction cache location corresponding to the target cache address, and responsive to receiving a data cache block store instruction from the processor or a write with clean operation from a higher level cache while the coherency maintenance mode is not enabled,
       writing modified data, if any, in the data cache location corresponding to the target cache address to a lower level bus, and
       initiating a clean operation on the lower level bus.

11. The data processing system of claim 10, further comprising:
    a register within the processor containing a mode bit enabling the coherency maintenance mode.

12. The data processing system of claim 10, further comprising:
    a data cache block store instruction within the processor containing a hint bit enabling the coherency maintenance mode.

13. The data processing system of claim 10, wherein each cache level within the storage hierarchy having bifurcated instruction and data caches further comprises:
    means, responsive to receiving a data cache block store instruction from the processor or a write with clean operation from a higher level cache while the coherency maintenance mode is enabled, for writing the modified data to a unified instruction/data cache within the storage hierarchy.

14. The data processing system of claim 10, wherein each cache level within the storage hierarchy having bifurcated instruction and data caches further comprises:

means, responsive to receiving a data cache block store instruction from the processor or a write with clean operation from a higher level cache while the coherency maintenance mode is enabled, for writing the modified data to a system memory.

15. The data processing system of claim 10, wherein each cache level within the storage hierarchy having bifurcated instruction and data caches further comprises:

means, responsive to receiving a data cache block store instruction from the processor or a write with clean operation from a higher level cache while the coherency maintenance mode is enabled, for determining whether data within the data cache location corresponding to the target cache address is modified; and means, responsive to determining that data within the data cache location corresponding to the target cache address is modified, for:

pushing the data to a lower level bus; and initiating a clean operation on the lower level bus.

16. The data processing system of claim 15, further comprising:

means, responsive to determining that data within the data cache location corresponding to the target cache address is not modified, for initiating a clean operation on the lower level bus.

17. The data processing system of claim 10, wherein each cache level within the storage hierarchy having bifurcated instruction and data caches further comprises:

means, responsive to receiving a data cache block store instruction from the processor or a write with clean operation from a higher level cache while the coherency maintenance mode is enabled, for determining whether a cache receiving the instruction is a unified cache;

means, responsive to determining that the cache receiving the instruction is not a unified cache, for determining whether a lower cache receiving a clean operation including the target cache address is a unified cache; and means, responsive to determining that the lower cache receiving the clean operation is a unified cache, for initiating an instruction cache block invalidate instruction including the target cache address to a lower level bus.

18. The data processing system of claim 10, wherein each cache level within the storage hierarchy having bifurcated instruction and data caches further comprises:

means for initiating a clean with instruction block kill operation on a lower level bus.

* * * * *